(12) United States Patent
Fish

(10) Patent No.: US 11,597,404 B2
(45) Date of Patent: Mar. 7, 2023

(54) TRAFFIC SIGNAL ALARM DEVICE

(71) Applicant: Robert D. Fish, Irvine, CA (US)

(72) Inventor: Robert D. Fish, Irvine, CA (US)

( * ) Notice: Subject to any disclaimer, the term of this patent is extended or adjusted under 35 U.S.C. 154(b) by 0 days.

(21) Appl. No.: 17/029,403

(22) Filed: Sep. 23, 2020

(65) Prior Publication Data

US 2022/0089173 A1    Mar. 24, 2022

(51) Int. Cl.
| | | |
|---|---|---|
| *B60W 50/14* | (2020.01) | |
| *B60R 11/04* | (2006.01) | |
| *G06T 7/55* | (2017.01) | |
| *G06V 10/56* | (2022.01) | |
| *G06V 20/58* | (2022.01) | |
| *B60R 11/00* | (2006.01) | |

(52) U.S. Cl.
CPC ............ *B60W 50/14* (2013.01); *B60R 11/04* (2013.01); *G06T 7/55* (2017.01); *G06V 10/56* (2022.01); *G06V 20/582* (2022.01); *G06V 20/584* (2022.01); *B60R 2011/0003* (2013.01); *B60W 2050/143* (2013.01); *G06T 2207/30252* (2013.01)

(58) Field of Classification Search
CPC ............ B60W 50/14; B60W 2050/143; G06T 7/55; G06T 2207/30252; B60R 11/04; B60R 2011/0003; G06K 9/00818; G06K 9/00825; G06K 9/4652
See application file for complete search history.

(56) References Cited

U.S. PATENT DOCUMENTS

| | | | |
|---|---|---|---|
| 9,248,832 B2* | 2/2016 | Huberman | G05D 1/0088 |
| 9,535,423 B1* | 1/2017 | Debreczeni | G08G 1/16 |
| 10,083,607 B2 | 9/2018 | Ginsberg | |
| 10,141,716 B1* | 11/2018 | Lenius | G01S 17/10 |
| 10,528,047 B1* | 1/2020 | Trujillo | B60W 40/08 |
| 10,678,244 B2* | 6/2020 | Iandola | B60W 40/02 |
| 2015/0151725 A1* | 6/2015 | Clarke | B60W 30/143 |
| | | | 701/28 |
| 2017/0256034 A1* | 9/2017 | Bai | G06F 3/147 |
| 2017/0371608 A1* | 12/2017 | Wasserman | G06Q 30/0261 |
| 2018/0025636 A1* | 1/2018 | Boykin | H04R 3/005 |
| | | | 701/1 |
| 2018/0244195 A1* | 8/2018 | Haight | B60Q 1/0023 |
| 2019/0031146 A1* | 1/2019 | Etonye | B60R 25/01 |
| 2019/0101919 A1* | 4/2019 | Kobilarov | G05D 1/0055 |
| 2019/0205674 A1* | 7/2019 | Silver | G06K 9/00818 |
| 2019/0270431 A1* | 9/2019 | Clift | B60S 1/16 |
| 2020/0250473 A1* | 8/2020 | Elluswamy | G16Y 20/10 |
| 2020/0257317 A1* | 8/2020 | Musk | G05D 1/12 |
| 2020/0265247 A1* | 8/2020 | Musk | G06K 9/6289 |

(Continued)

*Primary Examiner* — Santiago Garcia
(74) *Attorney, Agent, or Firm* — Fish IP Law, LLP

(57) ABSTRACT

The inventive subject matter provides devices and methods for improving driving safety using information obtained from images taken by a camera in a device. Among other things, contemplated devices and methods can produce alarms when it appear from rates of speed and acceleration/deceleration, that a vehicle will likely go through a red light, or fail to stop or sufficiently slow down at a stop sign. A significant feature of preferred devices and methods is that they are not dependent on WI-FI, cellular, satellite and radio signals, or any other external data transmission, and are not even dependent on speed, acceleration, or other information native to the vehicle.

19 Claims, 3 Drawing Sheets

(56) References Cited

U.S. PATENT DOCUMENTS

| | | | | |
|---|---|---|---|---|
| 2020/0307437 A1* | 10/2020 | Thieberger | ............ | B62D 31/003 |
| 2020/0320807 A1* | 10/2020 | Gorti | ..................... | G07C 5/0808 |
| 2020/0320875 A1* | 10/2020 | Lacaze | ................. | G05D 1/0293 |
| 2020/0380789 A1* | 12/2020 | Hutten | ................. | H04N 5/7805 |
| 2020/0384998 A1* | 12/2020 | Yang | ..................... | B60W 10/18 |
| 2020/0401136 A1* | 12/2020 | Iandola | ................ | G05D 1/0088 |
| 2021/0046949 A1* | 2/2021 | Ito | ......................... | B60W 50/14 |

\* cited by examiner

TRAFFIC SIGNAL ALARM DEVICE

The field of the invention is driving safety and traffic signals.

BACKGROUND

The following description includes information that may be useful in understanding the present invention. It is not an admission that any of the information provided herein is prior art or relevant to the presently claimed invention, or that any publication specifically or implicitly referenced is prior art.

Approximately 1.35 million people die each year as a result of road traffic crashes. Traffic intersections can be especially dangerous. Statistics show that approximately 33 percent of all traffic accidents occurs at an intersection, and a staggering number of these accidents occur when a driver passes through the intersection under a red or yellow traffic light. A common problem is that drivers are distracted by the use of a smartphone or radio, and are not paying attention to nearby stop signals.

U.S. Pat. No. 9,248,832 to Huberman describes an alarm system that alerts a driver when his/her vehicle passes through an intersection under a yellow or red traffic light. The status (red/yellow/green) of the traffic light is obtained from the traffic light controller, which of course means that data from the traffic controller is transmitted to the vehicle, in most cases using cellular, Wi-Fi, or satellite signals. There are several problems with such a system, including that the data signals can be weak, or even completely unavailable.

U.S. Pat. No. 10,083,607 to Ginsberg et al. describes an autonomic driving system that uses satellite derived information such as GPS, and has similar concerns to that described above.

Huberman, Ginsberg, and all other publications identified herein are incorporated by reference to the same extent as if each individual publication were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need to improve driving safety by alerting drivers to stop signals.

SUMMARY OF THE INVENTION

The inventive subject matter provides systems and methods in which stop signal information is obtained from images taken by a camera positioned inside of a vehicle, preferably without utilizing data transmission from Wi-Fi, cellular, satellite, or any other pathways, and without utilizing speed or other data native to the vehicle.

The inventive subject matter includes a method of improving safety of a motor vehicle having a windshield, comprising steps of
1) Providing a device that includes (a) a camera configured to provide image data, and (b) a processor configured to analyze the image data;
2) Positioning the device in the motor vehicle such that the camera can take at least first, second, and third images through a windshield;
3) Associating the at least first, second, and third images with at least first, second, and third times, respectively;
4) Detecting a stop signal within each of the at least first, second, and third images using the processor;
5) Using the processor, the at least first, second, and third images, and the at least first, second, and third times to estimate a likelihood that the vehicle will stop before reaching entrance to an intersection, a crosswalk, or a target location; and
6) Issuing an alarm if the estimated likelihood is that the vehicle will enter the target location while the stop signal indicates that the vehicle should stop. In a preferred embodiment, the alarm is triggered only if the estimated likelihood is also greater than a selected risk tolerance. Where the stop signal is a stop sign, the alarm can be set to be triggered only if the vehicle is estimated to be moving into the target location above a specified speed, thus allowing for rolling stops.
7) Alarms can be terminated or delayed when the alarm condition no longer exists.

A significant feature of preferred devices and methods is that they are not dependent on WI-FI, cellular, satellite and radio signals, or any other external data transmission, and are not even dependent on speed, acceleration, as well as information native to the vehicle.

As used herein, the term "stop signal" includes a stop sign, a traffic light, the lighted color of a traffic light, and a brake light of a preceding car. In some embodiments, when the lighted color of the traffic light is green/blue, the device may wait an amount of time and take another image after the waiting period. Contemplated waiting times include anywhere between 0.1 and 5 seconds.

In preferred embodiments, the selected risk tolerance is also user adjustable.

Alarms can be triggered by any suitable means, and preferably by a combination of light and sound light. An advantage of using both light and sound is that alerts can escalate from unobtrusive steady light, to blinking lights, and on to include soft sounds and harsh sounds. In some contemplated embodiments, no alarm is triggered if current speed is lower than preset speed As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1A:
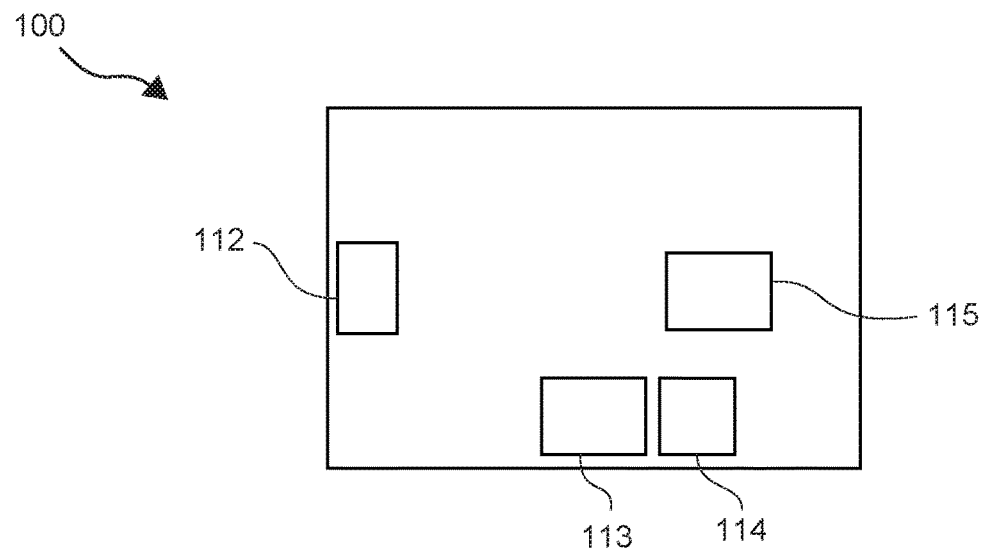
FIG. 1A is a schematic view of a device having a camera, a processor, a time measuring component and a designated area to terminate an alarm.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

All methods described herein can be performed in any suitable order unless otherwise indicated herein or otherwise clearly contradicted by context. The use of any and all examples, or exemplary language (e.g. "such as") described with respect to certain embodiments herein is intended merely to better illuminate the invention and does not pose a limitation on the scope of the invention otherwise claimed. No language in the specification should be construed as indicating any non-claimed element essential to the practice of the invention.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The inventive subject matter provides systems and methods in which stop signal information is obtained from images taken by a camera positioned inside of a vehicle. A significant feature of contemplated systems and methods is that they can be fully operational without dependence on any external data transmission, and without dependence on information native to the motor vehicle, for example, the vehicle's speed and acceleration obtained from wheel rotation.

As used herein, a target location (e.g., 246) refers to a location where a vehicle is supposed to stop to avoid illegal activity.

As used herein, a threshold distance (e.g., 245) is a distance between a stop signal (220) and a target location (246). The threshold distance can be user adjustable. In a preferred embodiment, the user can provide different threshold distances for different types of stop signals. For example, a user might set as a threshold distance, 5 m (meters) for a traffic light, 0 m for a stop sign, and 5 m for a brake light of a preceding vehicle. Where the stop signal is within an intersection (250), or at a far end of an intersection, the threshold distance can advantageously should take into account the size of the intersection. Where the stop signal is a brake or other light in a leading vehicle, the target location will likely not be a fixed position in space, but rather a position relative to the leading vehicle, and the threshold distance stop signal might well depend on the speed of the vehicle carrying the device (e.g., 100).

As used herein, an alarming distance (e.g., 247) refers to a distance from a target location. Typically, a device contemplated herein would trigger an alarm only when the vehicle is within the alarming distance. The alarming distance can also be user adjustable. In a preferred embodiment, the alarming distance for each of the stop signals can be different, for example, 100 m for a traffic light, 20 m for a stop sign, and 10 m for a brake light of a preceding vehicle. Where the stop signal is a brake or other light in a leading vehicle, the alarming distance might also depend on the speed of the vehicle in which the contemplated device is positioned.

Triggering of an alarm is should be interpreted herein in its broadest possibly manner, including that the device (100) issues alarms, or that the device (100) signals another device to issue an alarm. For example, device (100) might well be a cell phone that is coupled by wire or wirelessly to a vehicle speaker. In such instances, device (100) might send an audio alarm to be rendered by a vehicle speaker, and/or device (100) might send a visual alarm to be displayed on a heads up dashboard display.

For simplicity of description and calculation in this application, distance from a vehicle carrying a device (100) to a stop signal is assumed to be the same as the distance from the device (100) to the stop signal—even though the device (100) would likely be located on a dashboard of the vehicle rather than at the very front of the vehicle.

FIG. 1A is a schematic of a device (100) according to inventive subject matter herein. Device (100) has a camera (112), a processor (113), a time measuring component (114) and a designated area to terminate an alarm (115). The time measuring component (114) is likely to be a clock within the processor.

Figure 1B:
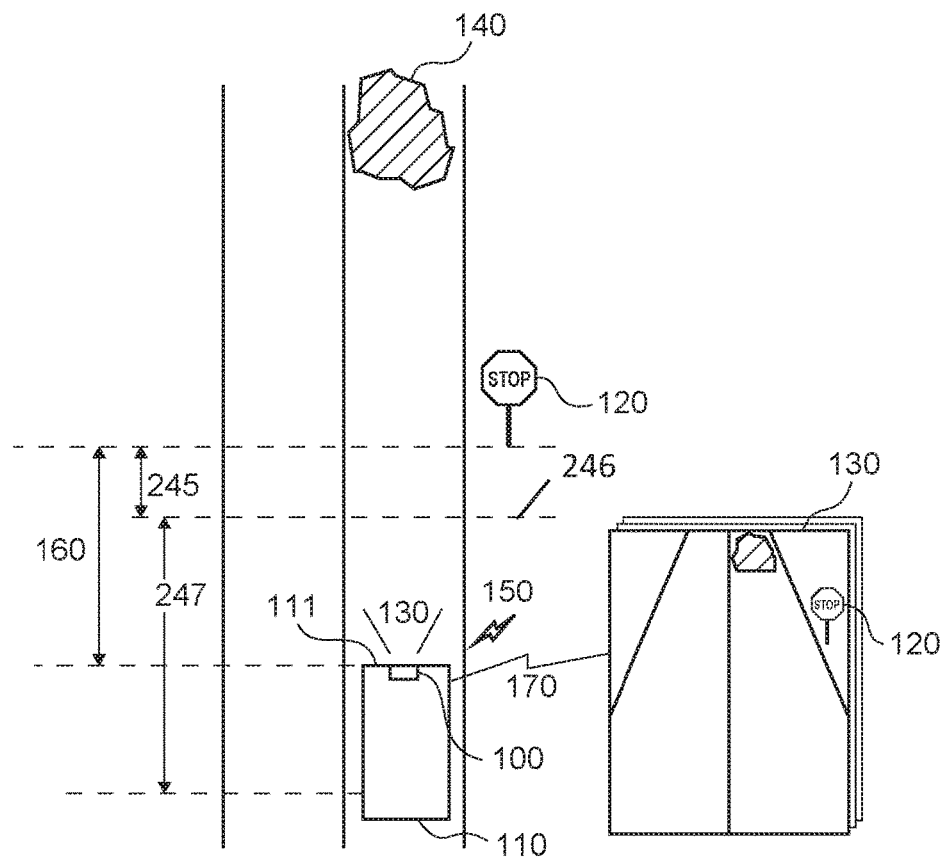
FIG. 1B shows a schematic view of a car and a stop sign on a street and a corresponding picture taken by a camera.

FIG. 1B shows a vehicle (110) coming closer to a stop sign (120). The device (100) is positioned on or near a windshield (111), such that the camera (112) can record forward images (130) from the vehicle (110). Device (100) is preferably, but not necessarily, a smartphone.

The processor (113) is configured to detect the stop sign (120) within the images (130). An analytical method to detect a stop sign within an image is described in US20200135016A1, which is incorporated herein by reference in its entirety. Other analytical methods and combination of known methods can be also used to detect stop signs.

Once stop sign (120) is detected, the processor (113) analyses whether the vehicle is located within the alarming distance (247). When the vehicle (110) is outside of the alarming distance (247), the device (100) will likely continue to take sets of images from time to time, trying to detect one or more stop signals (120, 220, 312). When the vehicle (110) is within the alarming distance (247), and the vehicle is accelerating (acceleration >0, determination of acceleration is described in FIG. 2), an alarm signal (180) is very likely triggered, depending on many factors. When the vehicle is decelerating (acceleration <0), the alarm signal (180) might or might not be triggered, again depending on many factors (details in description of FIG. 2).

All manner of alarm signals (180) are contemplated, including for example, sounds and/or lights, and specifically including beeping sounds and flushing/blinking lights. Alarm signal can be terminated as appropriate, for example, when the device detects appropriate deceleration of the vehicle. In some embodiments, an alarm signal can be terminated when a driver or other user touches a designated area (115) of the device (100), or issues an auditory command to the device (100) to stop the alarm signal.

Figure 2:
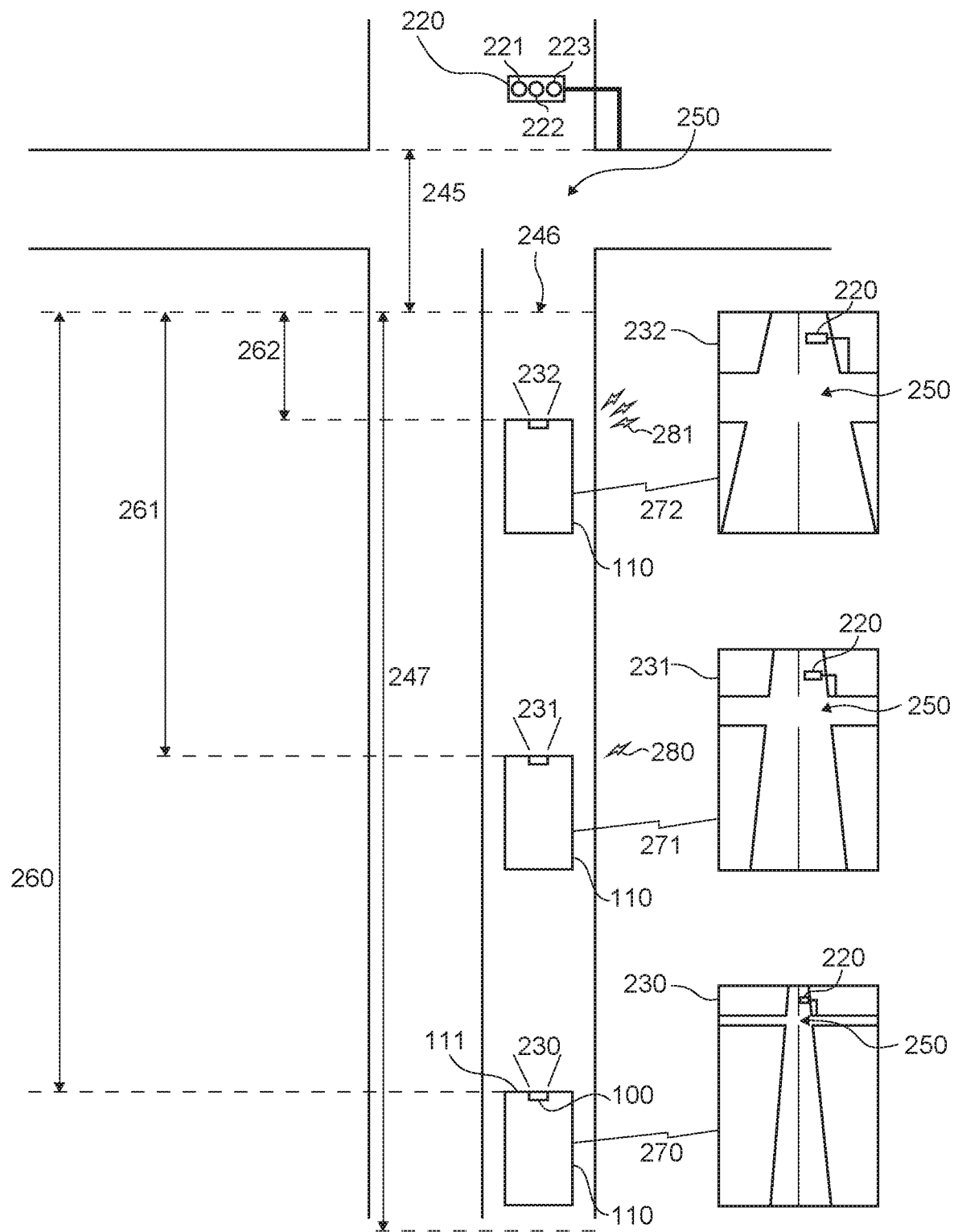
FIG. 2 shows a car and a traffic light on a street and a set of corresponding pictures at three different timings.

FIG. 2 shows a schematic view of vehicle (110) approaching a traffic light (220). In this case there are multiple stop signals, including a traffic light (220), a stop sign (120), and other signals such as a brake light of a preceding vehicle (312). The device (100) is preferably positioned on or near a windshield (211), such that the camera (112) can record front facing images (230, 231, 232) from within the vehicle (110).

Detection of Stop Signals and Distances

Processor (113) is configured to detect stop signals, including for example traffic light (220) within images (230, 231, 232). Once a stop signal is detected, the processor determines whether the vehicle (110) is within the alarming distance (247). If the vehicle is located outside the alarming distance (247), the device (100) will take additional images until the vehicle is located within the alarming distance (247). A contemplated analytical method to detect traffic lights, including vertical, horizontal, and arrow traffic lights, is described in U.S. Pat. No. 9,248,932, which is incorporated herein by reference in its entirety. Other methods or combination of the methods can be also used to detect traffic lights.

If the processor detects the traffic light (220) within the image (230, 231, 232), and the vehicle (110) is positioned within the alarming distance (247), the processor (113) analyzes the lighted color of the traffic light. A contemplated analytical method to analyze color in traffic lights is described in U.S. Pat. No. 9,248,932, which is incorporated herein by reference in its entirety. Other methods or the combination of the methods can be also used to analyze traffic light color. In preferred embodiments, detection of traffic lights and analysis of color is completely reliant on information contained in images (230, 231, 232) obtained from the camera (112). In preferred embodiments, extrinsic information, such as information from a traffic controller and/or a map, can optionally be used, but is not required.

In a preferred embodiment, when the lighted color (221, 222, 223) is detected as green or blue (223), the system can pause an amount of time, and then take another image and analyze the image again to detect the stop signal. The paused amount of time can be user adjustable, for example, 0.5 sec, 1.0 sec, 2.0 sec, or other delay up to 5 seconds.

When the lighted color (221, 222, 223) of the traffic light (220) shown in the image (230) is yellow (222) or red (221), the processor (113) is configured to calculate the vehicle distance (260, 261, 262) between the vehicle (110) and the traffic light (220) from the various images (230, 231, 232). The processor (113) also obtains from the time measuring component (114) the different time stamps (270, 271, 272) for each of the images (230, 231, 232).

Vehicle distance (260, 261, 262), and more generally distances between a vehicle and any stop signal can be determined using apparent changes in sizes of the stop signal between or among at least two images, according to methods describe in https://photo.stackexchange.com/questions/40981/what-is-the-relationship-between-size-of-object-with-distance, which is incorporated herein by reference in its entirety. Other methods include depth perception analysis, such as "3-D Depth Reconstruction from a Single Still Image" can be also used to calculate the distance. Combinations of methods can also be used to calculate the distance. Since both stop lights and stop signs can be assumed to have standard sizes, systems and methods contemplated herein can additionally or alternatively calculate distance by the sizes of such stop signals in the images taken by the device (100).

Velocity and Acceleration

Referring now to FIGS. 1 and 2, the processor (113) is configured to calculate the vehicle's speed and acceleration based upon deltas between successive distances (260, 261, 262), and their corresponding times (270, 271, 272), using general speed and acceleration equations. For example, a first speed of the vehicle, S1, can be calculated as the delta of the distances estimated by the first two images, divided by the delta of the time stamps for the first two images, (D1−D2)/(T2−T1). Similarly, a second speed of the vehicle, S2, can be calculated as the delta of the distances estimated by the second and third images, divided by the delta of the time stamps for the second and third images, (D2−D3)/(T3−T2). And acceleration/deceleration between the first and third images can be calculated as the change in speed from S1 to S2 divided by the time lapse from T1 to T3, (S1−S2)/(T3−T1).

Accordingly, determination of a vehicle's speed and acceleration can be calculated entirely based upon images and timing obtained from the device (100). In such embodiments there is no need to rely on any data transmission to the device using WIFI, satellite, cellular and radio signals, etc, and no need to rely on speed or other information originating from the native functions of the vehicle (110).

Positive and Negative Acceleration

As long as acceleration is calculated to be positive or zero when the vehicle (110) is within the alarming distance (247), the system can assume that the vehicle (110) will not stop before reaching the target location (246), and can trigger an alarm signal. In such instances escalating alarm signals can be triggered as the vehicle (110) approaches closer and closer to the target location (246). On the other hand, embodiments are contemplated in which no alarm is triggered, as long as the current speed is lower than a user-adjustable fixed speed, for example, 5 mph. This exception can be useful to prevent alarms from being triggered when a user wants to avoid alarms when using slow speed rolling stops at stop signs, or right turns on red.

Escalating alarm signals can be implemented in any suitable manner. For example, alarm signals can escalate from visual to auditory, or any combination of visual and auditory. By way of example, visual signals can escalate from steady state lights (280) to flashing lights (281), from slower flashing to faster flashing, from fewer lights to more lights, and/or from dimmer lights to brighter lights. And also by way of example, auditory signals can escalate from steady state (280) to intermittent (281), softer to louder, and/or lower to high pitch.

When acceleration is calculated to be negative, the vehicle (110) is decelerating, and the system could trigger no alarm at all, or could trigger one or more alarms, depending on how fast the vehicle is going, and how fast the deceleration is occurring relative to the distance from the target location (246). Rate of change in deceleration (jerk) can also be used in determining when and how alarms should trigger, and can be calculated from successive calculations of acceleration.

Likelihood Estimates and Risk Tolerance

As used herein, a likelihood estimate is an estimated (calculated) probability that a vehicle will pass through a target location while a stop signal is indicating that the vehicle should stop. Such estimations can be accomplished by assuming that a stop signal indicating that a vehicle should stop will continue with that indication, and (a) where acceleration is zero, that the vehicle maintains the current speed to the target location, or (b) where acceleration is not zero, that the speed will continue to be altered by the current acceleration. Where changes in rate(s) of acceleration (jerk) is/are calculated, that information can also be used to determine successive likelihood estimates.

As used herein, risk tolerance refers to a level of risk that a person is willing to take to avoid passing through a red light or stop sign, or in some other manner illegally failing to stop before reaching a target location. Risk tolerance is preferably user adjustable to different circumstances. For example, a user might select a higher risk tolerance for stop signs or yellow lights, a lower risk tolerance for red lights, and a lowest risk tolerance for blinking red lights or stop signals carried by a person directing traffic.

As applied to FIG. 1B, the processor (113) calculates successive or periodic likelihood estimates that the vehicle (110) will pass through the target location (246) while the stop signal is indicating that the vehicle (110) should stop. The processor (113) can then compare current likelihood estimates against the selected risk tolerance for the current situation, to determine when (and which) alarm signal(s) are to be triggered. Fixed stop signs can be deemed to always indicate that the vehicle should stop.

For illustrative purposes in this application, likelihood estimates can range from 0 to 100. A likelihood estimate of 0 indicates that there is little or no chance for the vehicle to pass illegally into the target location, and a likelihood estimate of 100 indicates that the vehicle has essentially a 100% chance of passing illegally into the target location. Also for illustrative purposes in this application, risk tolerances can range from 0 to 100, where 0 indicates low risk tolerance, and 100 indicates maximum risk tolerance. If a current likelihood estimate is higher than the then-current risk tolerance, the processor (113) triggers issuances of one or more alarm signals. If the discrepancy between estimated likelihood and risk tolerance is high, as for example, when the estimated likelihood is 75 and the risk tolerance is 25 (discrepancy of 50), the processor (113) could trigger a more urgent appearing/sounding alarm signal than if the estimated likelihood were 50 and the risk tolerance were 40 (discrepancy of 10).

Alarm signals can advantageously be terminated when the likelihood is lower than the selected risk tolerance, or when the stop signal is no longer indicating that the vehicle (110) should stop, as for example when a traffic light is changed from red to green or blue (223). In some embodiments, the signal can be terminated when the designated area (115) is touched.

Figure 3:
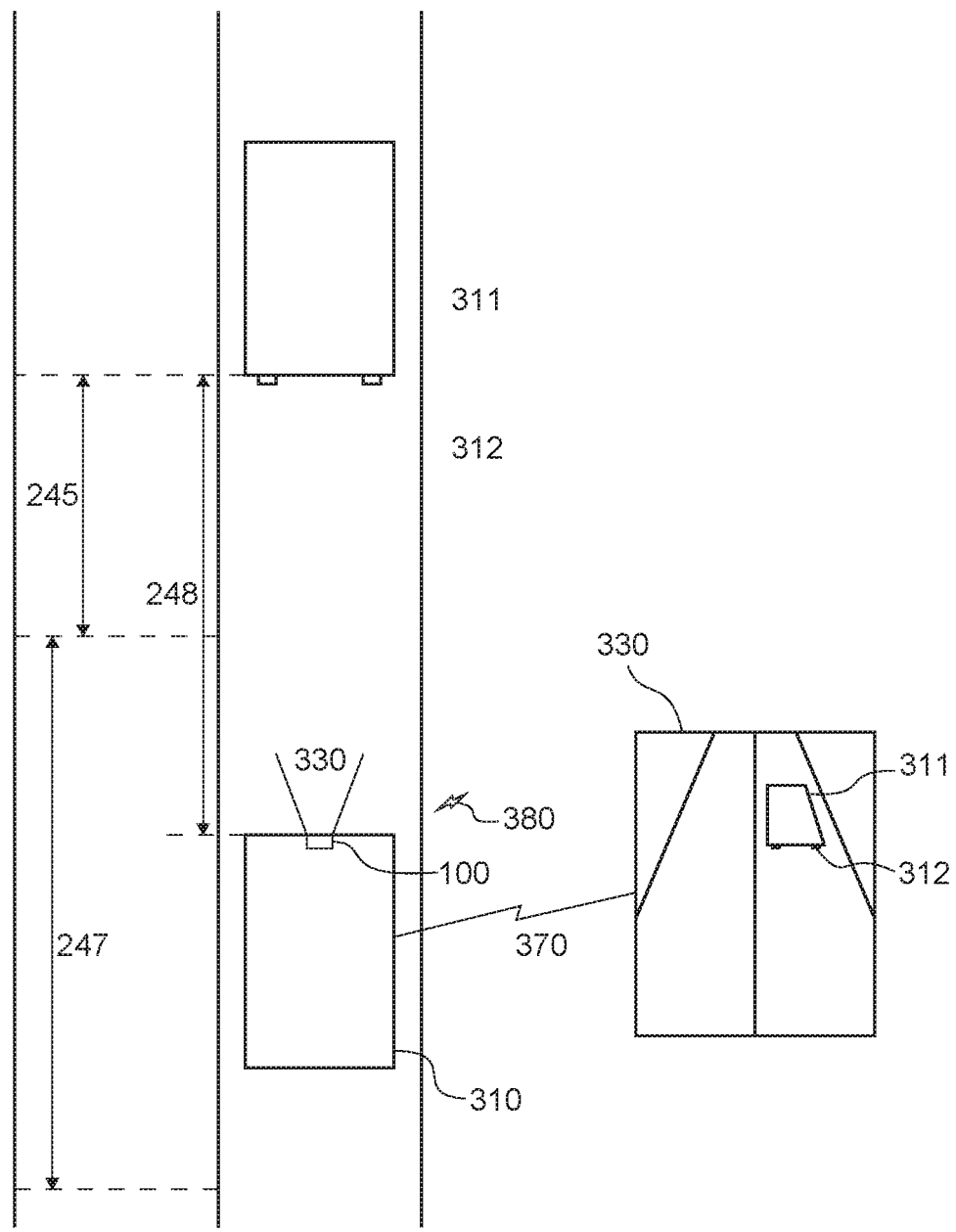
FIG. 3 shows two cars driving on the same lane, carrying the present inventive device in the following car.

FIG. 3 shows a schematic view of leading (311) and following (310) cars, driving in the same lane, where an instance of the device (100) is set on the dashboard of the following car (310), facing at least mostly forward. In such instances, an illuminated brake light (312) of the preceding car (311) can be considered as a stop signal, and distances from the distances (248) from the device (100) to the brake light (312) are deemed to be the distances (D1, D2, D3) etc in the discussion of speed and acceleration discussed above. Likelihood estimates and risk tolerances to issuance of alarm signals can also be determined as discussed above.

Device (100) detects the illuminated brake light (312) of leading vehicle (311), and estimates the inter-vehicle distance between (248) the brake light (312) and the vehicle (310). Contemplated systems and methods for detection of the brake light (312) and the estimation of the inter-vehicle distance (248) are described in "Brake light Detection by Image Segmentation by Tantalo et al.", that is incorporated herein by reference in its entirety. Other analytical methods and the combination of the methods can be used to detect the brake light and to estimate the distance.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for improving safety of a motor vehicle having a windshield, comprising:
   providing a portable device that includes (a) a camera configured to provide image data, and (b) a processor;
   positioning the device in the motor vehicle such that the camera can take at least first, second, and third images through the windshield;
   taking the at least first, second, and third images through the windshield;
   associating the at least first, second, and third images with at least first, second, and third times, respectively;
   using the processor to:
      detect a stop signal within each of the at least first, second, and third images;
      use relative changes in size of the stop signal in the at least first, second, and third images, over the at least first, second, and third times, respectively, to calculate a speed and an acceleration of the vehicle, and to estimate a likelihood that the vehicle will stop before reaching a target location based at least in part upon the calculated speed and acceleration; and
      without relying on any information native to the vehicle, trigger an alarm if the estimated likelihood is that the vehicle will enter the target location while the stop signal indicates that the vehicle should stop; and
   a human acting to terminate the alarm.

2. The method of claim 1, wherein the stop signal is a traffic light.

3. The method of claim 2, further comprising detecting a lighted color of the traffic light.

4. The method of claim 3, further comprising, upon discovering that the stop signal in the third image is not indicating that the vehicle should stop, waiting for a user adjustable amount of time before taking another set of images.

5. The method of claim 1, wherein the stop signal is a stop sign.

6. The method of claim 1, wherein the stop signal is a braking light on a second vehicle in front of the vehicle.

7. The method of claim 1, further comprising calculating the threshold distance as a function of where the stop signal is relative to an upcoming intersection.

8. The method of claim 1, wherein the selected risk tolerance is user adjustable.

9. The method of claim 1, wherein the device does not require WIFI, cellular, satellite or radio signal to estimate the likelihood.

10. The method of claim 1, wherein the device does not require information originated from the motor vehicle to estimate the likelihood.

11. The method of claim 1, wherein the alarm is selected from the group consisting of sound and light.

12. The method of claim 1, wherein no warning if current speed is lower than preset fixed speed.

13. The method of claim 1, further comprising terminating the alarm if the estimated likelihood is that the vehicle will avoid entering the target location while the stop signal indicates that the vehicle should stop.

14. The method of claim 1, further comprising estimating a current distance between the vehicle and the stop signal, using apparent changes in sizes of the stop signal within at least two of the at least first, second, and third images.

15. The method of claim 14, further comprising estimating the current distance using a depth perception analysis performed by the processor on at least one of the at least first, second, and third images.

16. The method of claim 1, further comprising issuing the alarm only when the estimated likelihood is greater than a user-selected risk tolerance.

17. The method of claim 1, further comprising delaying issuing of the alarm when the estimated likelihood is greater than a user-selected risk tolerance.

18. The method of claim 1, wherein the speed is calculated entirely based upon the at least first, second, and third images, and the at least first, second, and third times.

19. The method of claim 1, wherein the device comprises a cell phone.

* * * * *